INVENTORS.
HAROLD N. BARR
BY LENNART A. SUNDQUIST

3,270,098
METHOD OF MAKING HOLLOW, SPHERICAL UO₂ PARTICLES
Harold N. Barr and Lennart A. Sundquist, Baltimore, Md., assignors, by mesne assignments, to the United States of America as represented by the United States Atomic Energy Commission
Filed Mar. 8, 1965, Ser. No. 438,139
4 Claims. (Cl. 264—.5)

This invention relates generally to the production of spherical ceramic grade, refractory oxide, nuclear fuel particles and is a continuation-in-part of co-pending U.S. application S.N. 144,837, entitled, "Method of Sphering Refractory Oxides," filed October 13, 1961, by Harold N. Barr, the co-inventor of this application.

Spherical ceramic grade, refractory oxide, nuclear fuel particles have often been used in fabricating nuclear fuel elements because the use of the spherical form will minimize fracturing or other damage of the particles during fabrication of the fuel elements therefrom. Moreover, the sphere form within a retaining metal matrix minimizes the radiation damage area around the particles and minimizes corrosion or reaction of the fuel and the matrix.

In the method of spheroidizing $UO_2$ particles described in the abovementioned co-pending parent application, powderous uranium dioxide is blended with $CaO-TiO_2$. The resulting mixture is pressed into a pellet, crushed by conventional means, and screened to provide granules of a size appropriate to evolve the anticipated sphere size. To this end the granules pass through a screen having a mesh sizes slightly larger than the ultimately desired size of the spheres. The granules thusly formed pass through an oxygen hydrocarbon flame of about 3000° C., as provided by oxyacetylene flame spray apparatus, the granules not being heated to the maximum available temperature. To this end the granules pass through the flame with a transit time that suitably regulates the heat input to the granules. The spheres so formed gradually cool as they move through the fringe portion of the flame. Having passed through the flame, the granules, now in the form of spheres, pass into a cooling medium. Screening provides the desired uniform size distribution.

This above described process for producing $UO_2$ particles of varying mesh size achieves high density spherical particles substantially without porosity. Recently, however, interest has been directed to the use of $UO_2$ spherical particles with a closed internal porosity. These porous spheres are dispersed in a metal matrix and formed into a reactor fuel element. The use of the fuel spheres with a closed, non-continuous internal porosity allow for the collection and containment of fission gases and permit higher burn-ups and/or higher temperatures in the fuel elements. Additionally, the closed cells in these porous particles provide more stable fuel elements and reduced expansion thereof for fuel elements in nuclear reactors and radioisotope heated thermionic generators.

In accordance with this invention, hollow, spherical, refractory oxide, nuclear fuel particles having a closed internal porosity are produced in a process similar in part to the above-described system for producing spherical $UO_2$ particles. More particularly, this invention contemplates a process in which the powderous $UO_2$ fuel is pre-oxidized, mixed with $CaO-TiO_2$, granulated, spheroidized in an oxyacetylene flame, cooled, reduced in hydrogen and sized. In one embodiment, this pre-oxidation comprises roasting the $UO_2$ powder in air at temperatures ranging fom 180° C. to 300° C. for 24 hours. With these conditions and materials the desired hollow spherical fuel particles with a large, uniform, central closed cell are obtained. Also, with the proper selection of these conditions and materials the size, and amount of the closed cells can be controlled.

It is an object of this invention, therefore, to provide hollow, spherical, refractory grade, ceramic nuclear fuel particles;

It is another object of this invention to provide spherical $UO_2$ fuel particles having a closed, non-continuous internal porosity;

It is another object of this invention to provide for the collection and containment of fission products in $UO_2$ particles;

It is another object of this invention to provide a method of making spherical $UO_2$ particles having closed, non-continuous internal pores;

It is another object of this invention to control the porosity of hollow spherical nuclear fuel particles;

It is another object of this invention to provide a large, central, closed cell;

It is another object of this invention to provide an improved fuel element having hollow spherical $UO_2$ particles in a retaining matrix.

It is a further object of this invention to provide for the increased burn-up and temperature in nuclear fuel particles;

It is still a further object of this invention to provide a system of reducing fuel element expansion in radioactive heated apparatus, such as thermionic generators.

The above and further novel features of this invention will appear more fully from the following detailed description when the same is read in connection with the accompanying figures, wherein.

Figure 1:
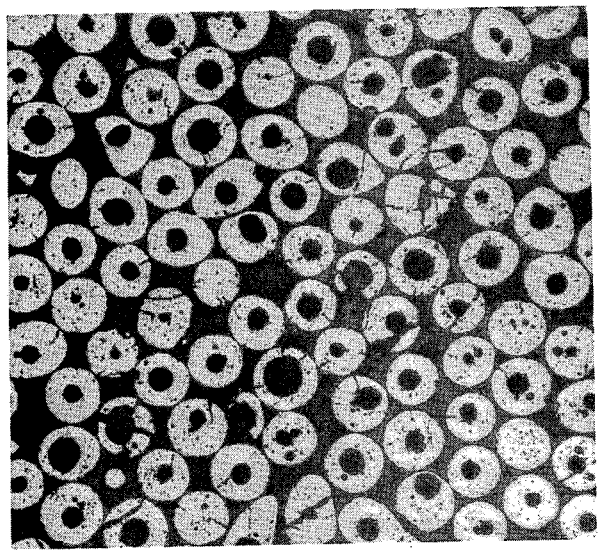
FIGURE 1 is a photomicrograph at a magnification of 100× of hollow (−120 +140) spherical $UO_2$ particles prepared from $UO_2$ pre-oxidized at 180° C.
Figure 2:
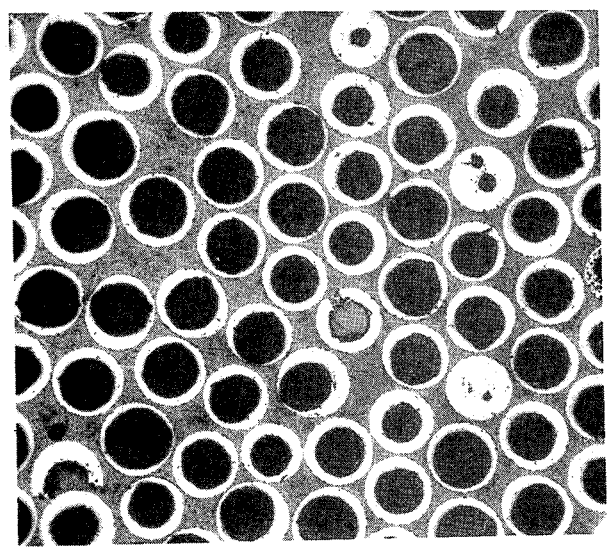
FIGURE 2 is a 100× photomicrograph at a magnification of 100× of hollow (−120 +140) spherical $UO_2$ particles prepared from $UO_2$ pre-oxidized at 300° C.

Referring to FIGS. 1 and 2, hollow, spherical $UO_2$ particles having closed internal porosity are shown that are suitable for use in fuel elements for nuclear reactors. One such reactor is shown and described in U.S. patent application S.N. 684,501, filed September 17, 1957, now abandoned. The fuel particles therefor are embedded in a metal matrix, such as stainless steel as described, for example, in U.S. application S.N. 283,126, filed by David E. Goslee et al. on May 24, 1963, and assigned to the assignee of this invention, but any other suitable fabrication method may be used which employs spherical, nuclear fuel particles imbedded in a metal matrix. This invention, however, may also be used in fuel elements for other reactors, such as thermionic generators, comprising a nuclear fuel element and another element forming a vapor space where small anode-cathode spacing is of utmost importance and the containment of fission gases and the reduction of internal pressures is necessary in achieving the operation of the thermionic diode for long periods of time at high operating temperatures at high efficiencies.

In preparing the spherical fuel particles in accordance with this invention conventional ceramic grade $UO_2$ powder having a small particle size is used.

The uranium dioxide powder is pre-oxidized by roasting the powder in air at temperatures ranging from 180° to 300° C. for 24 hours. The roasting operation at 180° C. increases the oxygen content to yield a uranium dioxide of the approximate formula $UO_{2.29}$ and the 300° roasting operation yields a uranium oxide of a $UO_{2.59}$ formula. The conditions of this oxidation have been found to be important in providing the advantageous uniform closed cells of this invention. Also, it has been found that the control of the amount of porosity, i.e. the closed cellular structure for a given fuel particle density, can be controlled through control of excess oxygen in the fuel particle powder roasting. To this end increased oxygen increases the size of the central closed cell.

This oxidized powder is blended with from 1/10 to 3.5 percent by weight titanium dioxide+calcium oxide. The resulting mixture is pressed into a pellet, crushed by conventional means, and screened to provide granules of a size appropriate to evolve the anticipated sphere size. To this end it has been found desirable to furnish granules at this step that pass a screen size slightly larger than the ultimately desired size of the spheres.

The granules thus formed pass through an oxygen-hydrocarbon flame a commonly provided by an oxyacetylene flame spray apparatus. During this step titanium dioxide-calcium oxide additive aids to lower the melting temperatures of the refractory oxide (uranium dioxide) sufficiently to melt and allow the assumption of a spherical form within the flame spray. It is to be noted that the maximum theoretical flame temperature of the oxyacetylene flame is about 3000° C. Heating of the granules passing through the flame is transitory, the granules not being heated to the maximum available temperature. Heat input to the granules is regulated by the time of transit within the flame. This flame process helps fuse and seal the surface of the particles and so that all the porosity is discontinuous to the surface, while the particles are formed into uniformly smooth spheres.

Having passed through the flame, the granules, now in the form of spheres, are directed into a cooling environment, which may be a receptacle of water. The spheres remain uniformly smooth during cooling and they may then be screened to provide a desired uniform particle size distribution. The particles are reduced in hydrogen at 1200° C. to finish the particles into $UO_2$, hollow, spherical particles.

This system achieves the hollow spherical ceramic grade, refractory nuclear fuel particles desired. Moreover, these particles have a uniform, large, central, closed cell and the control of the materials and conditions the recited limits achieves and controls the size of the large central closed cell. To this end the lower the roasting temperature in air the smaller is the central large cell. Contrawise, the higher the roasting temperatures in air the larger is the central, large, closed cell. The temperature thus controls excess oxygen in the fuel particles during roasting. This control however, may also be achieved by controlling the oxygen in the roasting container and selection of the particle size for roasting. The density of the particles and the size of the finished product can likewise be controlled by varying these conditions and materials with the described limits.

*Example*

A batch consisting of 350 grams of ceramic grade uranium dioxide powder was roasted in air at 180° C. for 24 hours. This roasting operation increased the oxygen content to yield a uranium oxide of the approximate formula $UO_{2.29}$.

A batch consisting of 350 grams of this roasted powder, 3% total by weight addition comprising 1.23 grams of titanium dioxide powder, and 0.27 gram of calcium oxide was placed in a stainless steel ball mill with 500 grams of 3/8 inch to 1/2 inch diameter balls. After adding 150 ccs. of distilled water, the mix was ball milled for four hours.

The batch was then filtered and the cake was dried in an oven. The batch was then compacted by placing 90 grams of dry powder blend in a 15/16" diameter die and pressed at 30 tons per square inch. The pellets were then cracked in a tool steel mortar and pestle to one-quarter inch lumps. The one-quarter inch lumps were then screened with a layer of stainless steel balls on a 100 mesh screen i.e. 100 meshes/linear inch and on a 120 mesh screen i.e. 120 meshes/linear inch. The material passing through the 100 mesh screen and remaining on the 120 mesh screen was then placed in the hopper of an oxyacetylene spray gun and flame sprayed. The flame was directed into a 3 inch pipe.

The resulting spheres were then reduced in hydrogen at 1200° C. to $UO_2$ and screened to recover −100 +140 mesh spheres, i.e. 105 microns diameter to 149 microns diameter spheres.

The resulting spheres were found to be substantially free of surface defects such as pits and the like. The spheres were mounted and polished to provide cross-sectional inspections. This revealed uniform density, hollow spheres with one central large closed cell on the inside and minor smaller closed cells around the major cell.

In another example, the only condition changed was the temperature of the roasting temperature. In this example, the roasting temperature was 300° C. for 24 hours in air. This roasting operation increased the oxygen content of the roasted material to yield $UO_2$ of the approximate formula $UO_{2.59}$. Again the resulting spheres formed were uniform density spheres substantially free from pits on the outside, and uniformly hollow on the inside, substantially with one large, central, uniform, closed cell on the inside. In this example the large or major closed cell in the particles is larger than the above described example and the amount of smaller closed cells is greatly reduced or substantially non-existent.

In the above recited examples the hollow spherical particles produced therein contained porosities over 50% and the entire porosity was closed and not continuous to the outside surface of the individual particles. The higher temperature roasting produced at least 50% porosity substantially without smaller surrounding pores. This compares with the open and continuous pores in, through, and on the heretofore known particles. Consequently, this open porosity of the latter will not contain the fission gasses and it has thus been reported that under reactor conditions a fuel rod 97% dense of these $UO_2$ particles was observed to release large amounts of fission gasses. Moreover, this fission gas release increases rapidly as one decreases the density of the fuel elements known heretofore.

In another embodiment $UO_2$ particles were oxidized to produce fine particle $U_3O_8$ and the latter was used in place of the partially oxidized $UO_2$ in the above examples and this resulted in hollow core $UO_2$ particles similar to the above-described particles. Likewise in another embodiment, $UO_2$ particles were converted to fine particle $UO_3$ and the latter was used in place of the partially oxidized $UO_2$ described above.

In still another embodiment of the above-described process the recited steps are used with various other additives. These additives, comprise $CaO-TiO_2-CaF_2$; $TiO_2$; $TiO_2-Nb_2O_5$ and $V_2O_5$.

The above described invention has the advantage of inexpensively and efficiently providing spherical, hollow, closed, refractory, nuclear fuel particles. These particles have the advantage of containment of the fission gasses produced within the fuel particles, e.g. $UO_2$, within a nuclear reactor thus permitting higher fuel element burn-up and temperatures. Moreover, these fuel elements and those for fueled thermionic generators having the fuel particles of this invention are stable, with reduced internal pressure and reduced expansion from the fuel elements known heretofore.

What is claimed is:

1. The method of producing spherical, hollow, ceramic, refractory $UO_2$ particles, comprising oxidizing $UO_2$ particles, mixing these oxidized particles with a small amount of $CaO-TiO_2$ powder, granulating the mixture, spheroidizing the sintered granulated material in a high temperature flame, cooling the spheroidized material and finishing the particles by reduction in hydrogen at high temperatures.

2. The invention of claim 1 in which the $UO_2$ particles are oxidized to produce particles selected from the group consisting of $UO_{2.29}$, $UO_{2.59}$, $UO_3$ and $U_3O_8$.

3. The invention of claim 1 in which said oxidizing consists of roasting $UO_2$ powder in air at from 180° C. to 300° C. for 24 hours.

4. The method of producing spherical, hollow, ceramic, refractory $UO_2$ particles, comprising roasting $UO_2$ powder at 300° C. for 24 hours, mixing the roasted particles with from 1/10 to 3.5 percent by weight $CaO$–$TiO_2$, granulating the mixture, spheroidizing the sintered material in an oxyacetylene flame of 3000° C. that partially melts said material, cooling the spheroidized particles in air, reducing said spheroidized particles in hydrogen at 1200° C., and sizing the reduced particles.

No references cited.

L. DEWAYNE RUTLEDGE, *Primary Examiner.*